United States Patent [19]
Okada et al.

[11] Patent Number: 5,965,856
[45] Date of Patent: Oct. 12, 1999

[54] PRESSURE SENSITIVE SWITCH

[75] Inventors: Shoji Okada, Anjou; Toshimitsu Oka, Okazaki; Naofumi Fujie; Kazuya Tanaka, both of Nagoya; Hitoshi Takayanagi, Chiryu, all of Japan

[73] Assignee: Aisin Seiki Kabushiki Kaisha, Kariya, Japan

[21] Appl. No.: 08/979,714

[22] Filed: Nov. 28, 1997

[30] Foreign Application Priority Data

Nov. 28, 1996 [JP] Japan ..................... 8-317514

[51] Int. Cl.$^6$ .............. H01H 35/02; H01H 3/02
[52] U.S. Cl. ......................... 200/85 A; 200/514
[58] Field of Search ................ 200/5 A, 85 R, 200/85 A, 512–517; 428/209

[56] References Cited

U.S. PATENT DOCUMENTS

| | | | |
|---|---|---|---|
| 3,718,791 | 2/1973 | Szablowski | 200/85 A |
| 4,137,116 | 1/1979 | Miller | 200/85 A X |
| 4,301,337 | 11/1981 | Eventoff | 200/5 A |
| 4,485,279 | 11/1984 | Nakamura | 200/5 A |
| 4,580,018 | 4/1986 | Yoshimara | 200/5 A |
| 4,725,479 | 2/1988 | Utsumi | 428/209 |
| 4,755,645 | 7/1988 | Naoki et al. | 200/512 X |
| 5,232,243 | 8/1993 | Blackburn et al. | 180/273 X |
| 5,475,192 | 12/1995 | Inagaki et al. | 200/512 X |
| 5,664,667 | 9/1997 | Kenmochi | 200/512 X |

FOREIGN PATENT DOCUMENTS 249029  10/1990  Japan .
2535120  6/1996  Japan .

Primary Examiner—J. R. Scott
Attorney, Agent, or Firm—Sughrue, Mion, Zinn, Macpeak & Seas, PLLC

[57] ABSTRACT

A sheet-like pressure sensitive switch is disclosed. A spacer 2 of an insulating material is interposed between a first film 1 of an insulating material which is provided with a first electrode 1a and a second film 3 of an insulating material which is provided with a second electrode 3a. The spacer 2 has a number of openings 2a, through which the first electrode 1a and the second electrode 3a oppose each other with an air gap therebetween. A first lead wire 4a and a second lead wire 4b are connected to the first electrode 1a and the second electrode 3a, respectively. In a pressure sensitive switch according to a first embodiment, the first and the second film 1, 3 are formed of polyethylene naphthalate films. In a pressure sensitive switch according to a second embodiment, the second film 3 is formed of polyethylene terephthalate film while the first film 1 is formed of polyethylene naphthalate film.

2 Claims, 4 Drawing Sheets

PRESSURE SENSITIVE SWITCH

FIELD OF THE INVENTION

The invention relates to a mechanical switch having a plurality of electrical conductors which are mechanically driven into contact with each other or away from each other, and in particular, while not intended to be limited thereto, to a flexible sheet-like pressure sensitive switch which is mounted on a seat to detect the presence or absence of an occupant thereon in a binary fashion through the contact or non-contact between the electrical conductors.

BACKGROUND OF THE INVENTION

A sensor known in the art which senses the seated condition of an occupant on a. vehicle seat comprises a magnet mounted on a seat, and a magnetic sensor mounted on the floor of a vehicle for detecting a change in a magnetic field produced by the magnet which moves vertically up and down as the seat moves vertically up and down, thus detecting a down movement of the seat. Japanese Registered Patent No. 2,535,120 (a counterpart corresponding to U.S. Pat. No. 5,232,243 discloses a seating sensor comprising a piezoelectric film excited by an associated electrical circuit, and a band-pass filter which detects an oscillation from the piezoelectric film. Upon seating, a contact member is brought into contact with the piezoelectric film to attenuate the oscillation occurring therein.

A pressure sensitive switch used for purposes other than detecting the seating on the seat is disclosed in Japanese Patent Publication No. 49,029/1990 which is a counterpart to U.S. Pat. Nos. 4,314,227; 4,315,238; 4,276,538; 4,314,228 and 4,301,337 in which a pressure sensitive switch used with a keyboard of an electrical instrument for generating musical tones detects a pressure applied in response to a change in the resistance across a pair of conductor plates which are disposed opposite to each other with a semiconductor body interposed therebetween.

With the first mentioned arrangement to detect the seating by the combination of the magnet and the magnetic sensor, a seat structure is required which enables a reliable magnet movement upon seating, and the provision of such a seat structure is expensive. In the seating sensor disclose in Japanese Registered Patent No. 2,535,120, the piezoelectric film is expensive, and it is also necessary to provide a feedback loop which maintains the piezoelectric film in oscillation and a filter which is used to detect an oscillation signal, resulting in a complicated arrangement and adding to the cost.

The pressure sensitive switch disclosed in Japanese Patent Publication No. 49,029/1990 is designed to detect the pressure applied to the keyboard as a player strikes it with a finger, and suffers from an impact resistance when used to sense a pressure caused by the physical weight of a man. In particular, the switch itself is expensive because silver or copper is used for the conductor plates.

SUMMARY OF THE INVENTION

It is an object of the invention to provide a pressure sensitive switch with a simple construction and with a high impact resistance inexpensively. In accordance with the invention, there is provided a pressure sensitive switch comprising a first film (1) of an insulating material and carrying a conductive layer (1a) on its reverse surface; a spacer (2) of an insulating material having one of a front and a reverse surface joined to the reverse surface of the first film and having an opening (2a) of an area which extends therethrough in the direction of thickness, the area of the opening being large relative to the thickness of the spacer; a second film (3) of an insulating material carrying a conductive layer (3a)on its reverse surface and having its reverse surface joined to the other of the front and the reverse surface of the spacer (2); and a first and a second lead wire (4a, 4b) connected to the conductive layers (1a, 3a)of the first film (1) and the second film (3), respectively, at least one of the first and the second film (1, 3) being formed by a polyethylene naphthalate film.

To facilitate the understanding, reference numerals and characters used to denote corresponding elements shown in an embodiment to be described later are entered in parentheses.

With the described pressure sensitive switch, when no intended depressing force is acting, the conductive layers (1a, 3a)which are disposed opposite to each other are removed from each other by the resilience of the respective films in the region of the opening (2a) in the spacer (2). Thus, the pressure sensitive switch is open or off. However, when a depressing force which is strong enough to flex the first film (1) and the second film (3) acts, both the first and the second film are depressed into the opening (2a), whereby their conductive layers (1a, 3a) are brought into contact with each other. Thus, the switch is closed or turned on.

Polyethylene naphthalate exhibits a high mechanical strength, making it suitable to be subject to a pressure caused by the physical weight of a man when placed under the seat. The glass transition point Tg where its physical properties (specific heat, expansion rate, compression rate etc.) change is as high as 113 degrees, and the material exhibits a good durability under high heat, and thus is durable to harsh conditions of use within a vehicle. In other words, this material exhibits a high reliability with time to operate as a pressure sensitive switch.

In a preferred embodiment of the invention, one of the first and the second film (1, 3) comprises a polyethylene naphthalate film while the other comprises polyethylene terephthalate. Since the polyethylene terephthalate is inexpensive, the pressure sensitive switch can be provided more inexpensively.

Other objects and features of the invention will become apparent from the following description of several embodiments thereof with reference to the drawings.

DESCRIPTION OF THE PREFERRED EMBODIMENTS

FIRST EMBODIMENT

Figure 1:
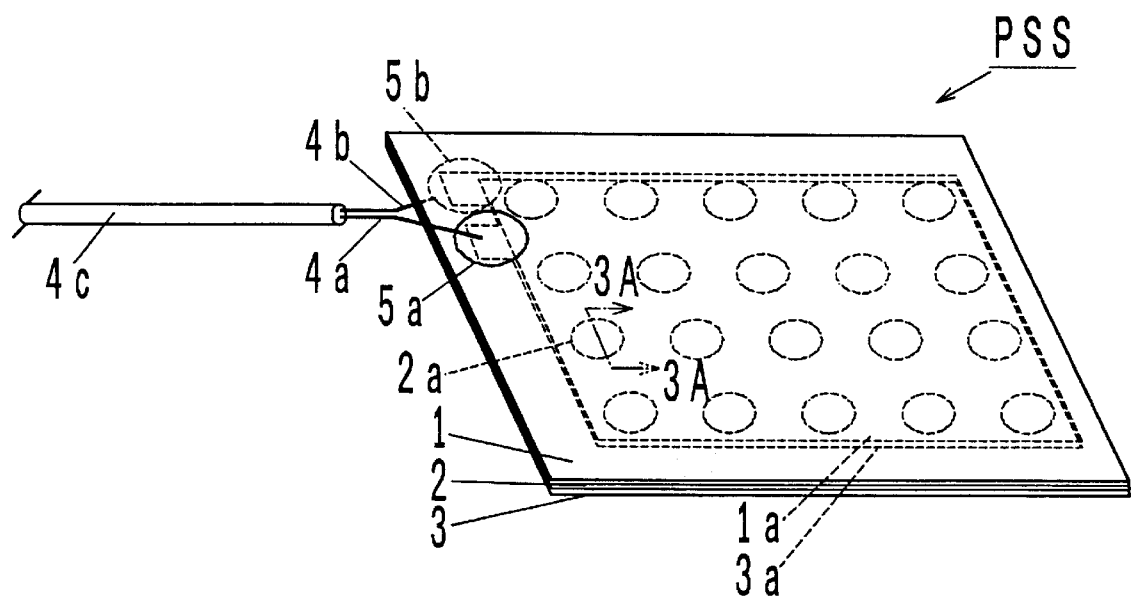
FIG. 1 is a perspective view showing the appearance of a first embodiment of the invention.

FIG. 1 shows the appearance of a pressure sensitive switch PSS according to a first embodiment of the invention. The pressure sensitive switch PSS comprises a cover film 1

Figure 2:
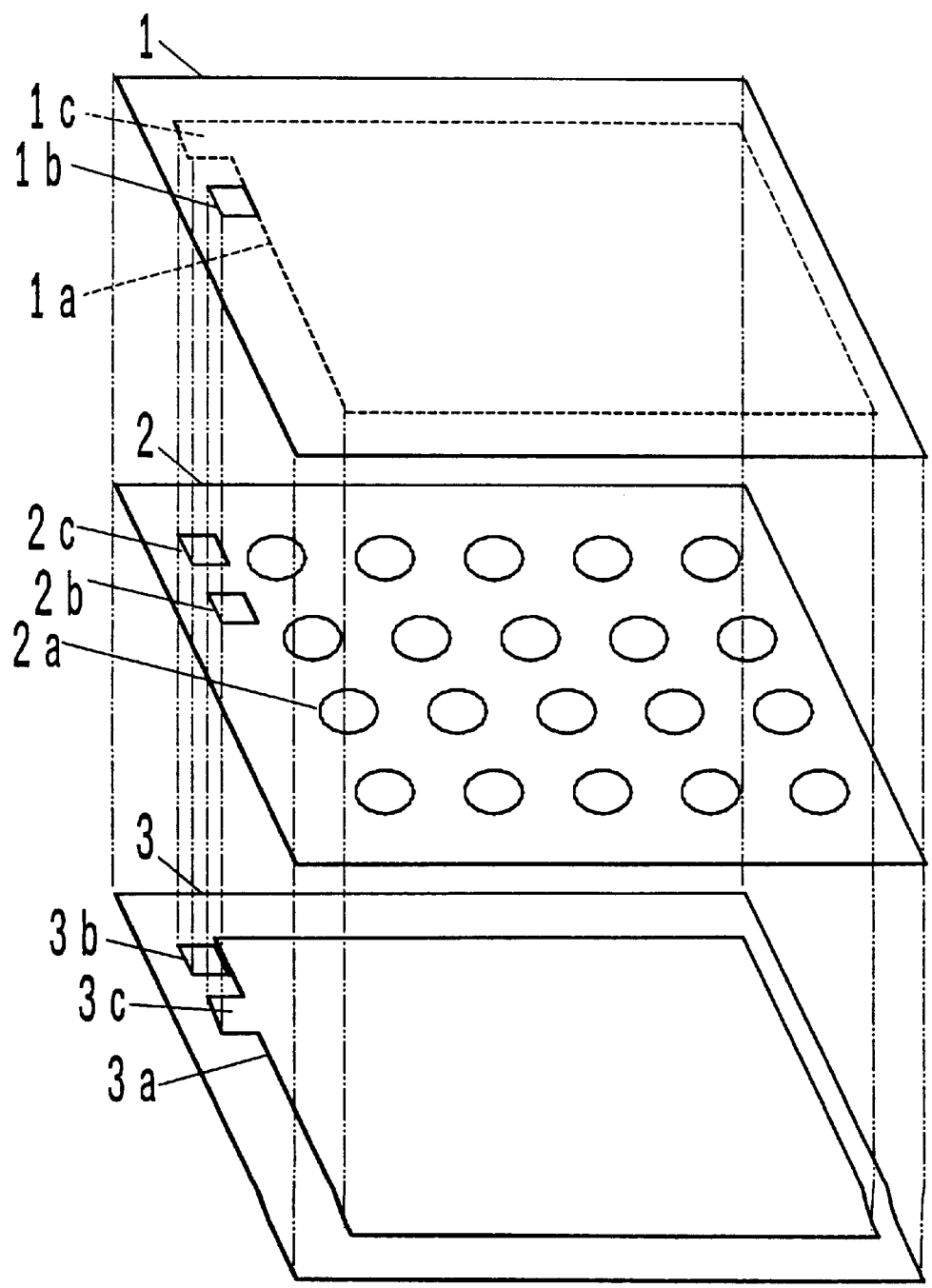
FIG. 2 is an exploded perspective view of a cover film 1, a spacer 2 and a support film 3 of a pressure responsive switch PSS showing in FIG. 1.

(first film), an insulating spacer 2 and a support film 3 (second film), which are laminated in the manner of a sandwich and integrally joined together. These components are shown in exploded form in FIG. 2. Accordingly, attention is directed to both FIGS. 1 and 2.

Figure 4:
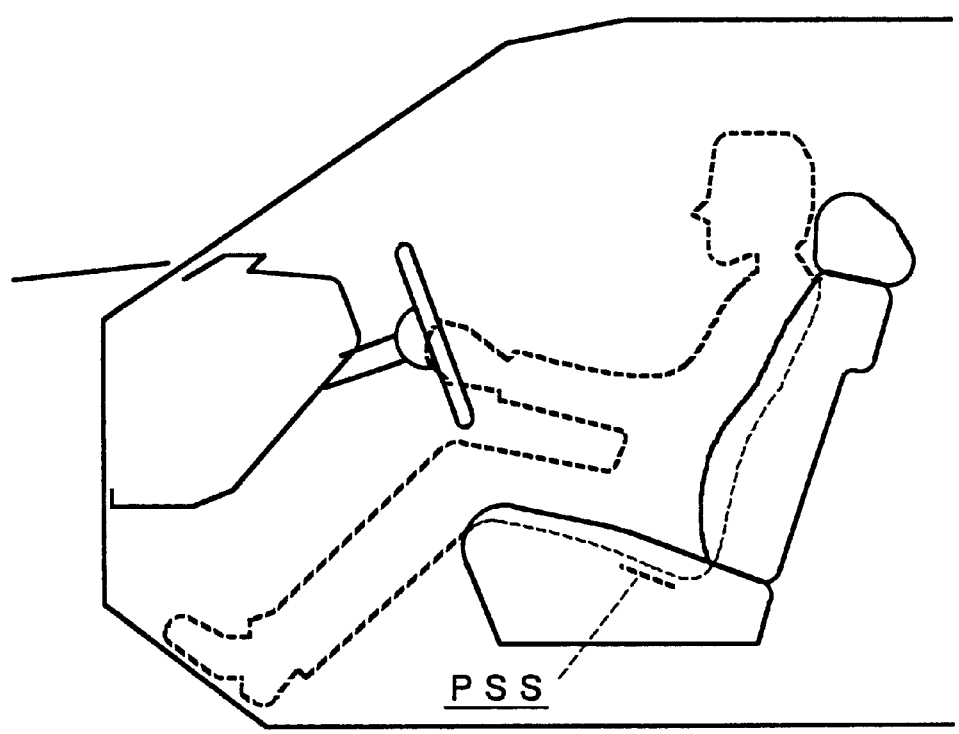
FIG. 4 is a side elevation of an onboard seat, also illustrating the location of a seating detecting switch which comprises the pressure sensitive switch PSS shown in FIG. 1 mounted on a seat within a vehicle.

The pressure sensitive switch PSS comprises a support film 3 formed of polyethylene naphthalate (which has a thickness of 100 $\mu$m in the present embodiment), a cover film 1 disposed in parallel relationship with and opposite to the reverse surface of the support film 3 (which has a thickness of 100 $\mu$m in the present embodiment), and an insulating spacer 2 held sandwiched between the support film 3 and the cover film 1 (and which is formed of polyethylene terephthalate and has a thickness of 125 $\mu$m in the present embodiment). As shown in FIG. 4, the pressure sensitive switch PSS is used as a seating detecting switch which is internally housed in an onboard seat adjacent to the surface layer of a seating pad thereof.

Toward one corner, the support film 3 is formed with a rectangular slot, which serves as a terminal window 3b. On its reverse or upper surface, the support film 3 is provided with a conductive layer 3a, which is a copper foil in the present embodiment and which is formed according to the printed circuit technique in a manner to avoid the terminal window 3b and the marginal edges of the support film 3. It will be seen that the conductive layer 3a is at a given distance located inwardly from the margins of the support film 3 so as to be spaced therefrom. However, a portion 3c located adjacent to the terminal window 3b projects toward the margin, and is hereafter referred to as "tab" 3c.

The cover film 1 is also formed with a rectangular slot, which serves as a terminal window 1b, at a location aligned with the tab 3c of the conductive layer 3a on the support film 3. On its reverse or lower surface, the cover film 1 is evenly provided with a conductive layer 1a, which is a copper foil formed according to the printed circuit technique in the present embodiment, while avoiding the terminal window 1b and marginal edges of the cover film 1. The conductive layer 1a is located inwardly from the margins of the cover film 1 at a distance therefrom, but includes a tab 1c at a location which is aligned with the terminal window 3b formed in the support film 3. The area and the location of the conductive layer 1a formed on the cover film 1 except for the tab 1c overlap the area and location of the conductive layer 3a on the support film 3 except for the tab 3c when the support film 3, the spacer 2 and the cover film 1 are integrally laminated together as shown in FIG. 1. However, it is to be noted that the tabs 1c and 3c are not aligned, but are offset relative to each other. The tab 3c of the support film 3 is aligned with the terminal window 1b in the cover film 1 while the tab 1c of the cover film 1 is aligned with the terminal window 3b of the support film 3.

The insulating spacer 2 is formed with a terminal window 2c which overlaps the terminal window 3b in the support film 3 and another terminal window 2b which overlaps the terminal window 1b in the cover film 1 when the support film 3 and the cover film 1 are integrally joined with the insulating spacer 2 as shown in FIG. 1. In an area of the insulating spacer 2 which is located opposite to a region of the conductive layers 3a, 2a on the support film 3 and the cover film 3, respectively, which excludes the tabs 3c and 1c, the insulating spacer 2 is formed with an array of 20 openings disposed in 4 rows each including 5 openings, extending through the spacer 2 in the direction of the thickness thereof. In the present embodiment, each opening is circular and has a diameter of 10 mm. The spacer 2 has a thickness of 125 $\mu$m, and accordingly, as compared with the thickness of the spacer, the diameter of 10 mm of each opening 2a is relatively large. The ratio of the diameter of the opening to the spacer thickness is chosen so that when a depressing force is applied to either the cover film 1 or the support film 3 to urge it toward the other, the film is flexed to bring the conductive layers 1a and 3a into contact with each other for a force which is greater than a given value while the both films are maintained apart due to the resilience of the films to keep the conductive layers 1a and 3a spaced from each other for a force which is below the given value.

The support film 3, the insulating spacer 2 and the cover film 1 are superimposed upon each other in the sequence named (FIG. 2) to be integrally joined together. Thereupon, the tab 3c of the conductive layer on the support film 3 is exposed through the terminal window 2b in the insulating spacer 2 and through the terminal window 1b formed in the cover film 1. Similarly, the tab 1c of the conductive layer of the cover film 1 is exposed through the terminal window 2c in the insulating spacer 2 and through the terminal window 3b in the support film 3. A core conductor of a lead wire 4b having an insulative coating which is contained in an electrical cord is soldered to the exposed tab 1c through the terminal windows 3b, 2c. Similarly, a core conductor of a lead wire 4a having an insulative coating is soldered to the exposed tab 3c through the terminal windows 1b, 2b. An insulative coating 5b is applied over and around the terminal windows 3b, 2c, and an insulative coating 5a is applied over and around the terminal windows 1b, 2b. This completes the pressure sensitive switch PSS as shown in FIG. 1.

Figure 3:
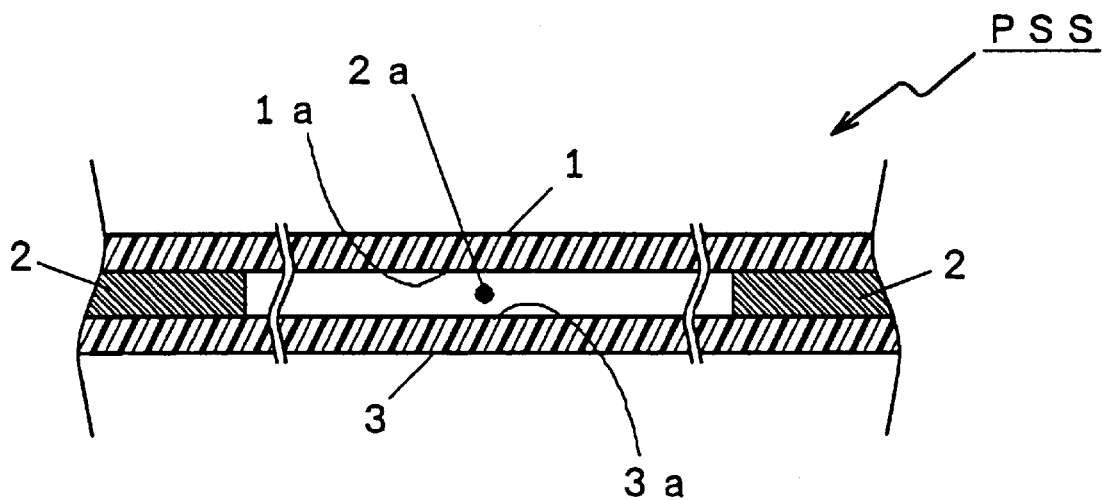
FIG. 3 is a cross section, to an enlarged scale, taken along line 3A–3A shown in FIG. 1.

FIG. 3 shows a cross section, to an enlarged scale, taken along the line 3A—3A shown in FIG. 1. When the pressure sensitive switch PSS is mounted on the seat within a vehicle in a manner shown in FIG. 4, if there is no occupant sitting on the seat, there is no depressing force which is applied to the pressure sensitive switch PSS, and accordingly, in the region of the opening 2a, the conductive layers 3a and 1a are not brought into contact with each other, and therefore the connection between the lead wires 4a, 4b is interrupted or the switch is off. When there is an occupant sitting on the seat, the cover film 1 is flexed under the weight (depressing force) of the occupant to be depressed into the opening 2a formed in the insulating spacer 2, whereby the conductively layer 1a disposed on the lower surface of the cover film 1 is brought into contact with the conductive layer 3a disposed on the upper surface of the support film 3. This completes the connection between the lead wires 4a, 4b or the switch is turned on.

Polyethylene naphthalate which is used as a material for the cover film 1 and the support film 3 exhibits a high mechanical strength and is suitable to be subject to a pressure caused by the physical weight of an occupant when it is disposed below the seat. It exhibits a glass transition point Tg where its physical properties (specific heat, expansion rate, compression rate etc.) change which is as high as 113 degrees, and exhibit a good durability under a high heat, and thus is durable to harsh conditions of use within a vehicle. It is only necessary that the conductive layers 1a, 3a be an electrical conductor and accordingly, they can be formed relatively simply and inexpensively, allowing the pressure sensitive switch PSS to be provided at a reduced cost.

SECOND EMBODIMENT

In a second embodiment, the material used for the support film 3 comprises polyethylene terephthalate, and has a thickness of 100 $\mu$m in this embodiment. In other respects, the arrangement is identical to the arrangement used in the first embodiment. Thus, the material for the cover film 1 comprises polyethylene naphthalate.

Polyethylene terephthalate has Tg point which is equal to 69 degrees, and is slightly inferior to polyethylene naphthalate in its. durability under a high heat, but is more inexpensive than polyethylene naphthalate, allowing the pressure sensitive switch PSS to be provided at a further reduced cost.

While it is described above that polyethylene terephthalate is used for the support film 3 while polyethylene naphthalate is used for the cover film 1 in the second embodiment, it is also possible that polyethylene naphthalate be used for the support film 3 while polyethylene terephthalate be used for the cover film 1.

In both the first and the second embodiments, the cover film 1, the spacer 2 and the support film 3 have been described as having substantially equal rectangular form. However, the lengths of the tabs 1c, 3c may be increased and the films 1, 3 and the spacer 2 may be increased in their lengths in the region of these tabs so that the area of connection with the lead wires project from the rectangular portion, thus displacing the area of connection out of the rectangular portion.

While preferred embodiments of the invention have been shown and described above, a number of changes and modifications are possible therein as described. Accordingly, it is not intended that the invention be limited to the specific construction or arrangement disclosed herein, but that the right is reserved to all changes and modifications coming within the scope of the invention defined by the appended claims.

What is claimed is:

1. A pressure sensitive seating switch adapted to be internally housed in a vehicle seat comprising:

a first flat resilient film of an insulating material carrying a flat conductive layer on its flat reverse surface;

a spacer of an insulating material having an opening of an increased area as compared with the thickness thereof and extending through the spacer in the direction of thickness, the spacer having one of its front and reverse surfaces jointed to the reverse surface of the first film;

a second flat resilient film of an insulating material carrying a flat conductive layer on its reverse surface, which is joined to the other of the front and the reverse surface of the spacer; and a first and a second lead wire connected to the conductive layers on the first and the second films, respectively;

wherein at least one of the first and the second films is formed of polyethylene naphthalate and a ratio of the size of the opening to the spacer thickness is chosen for flexing the films to bring the conductive layers into contact with each other by a force which is greater than a given value while both films are maintained apart due to the resilience of the films to keep the conductive layers spaced from each other when a force is below the given value.

2. A pressure sensitive switch according to claim 3, in which one of the first and the second films is formed of polyethylene naphthalate film while the other is formed of polyethylene terephthalate film.

\* \* \* \* \*